Jan. 2, 1968   J. W. VOLLMER   3,361,925
BISMUTH-LITHIUM HOLLOW CATHODE LAMPS
Filed Nov. 3, 1966
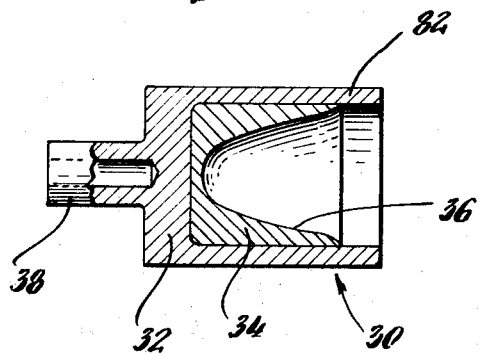
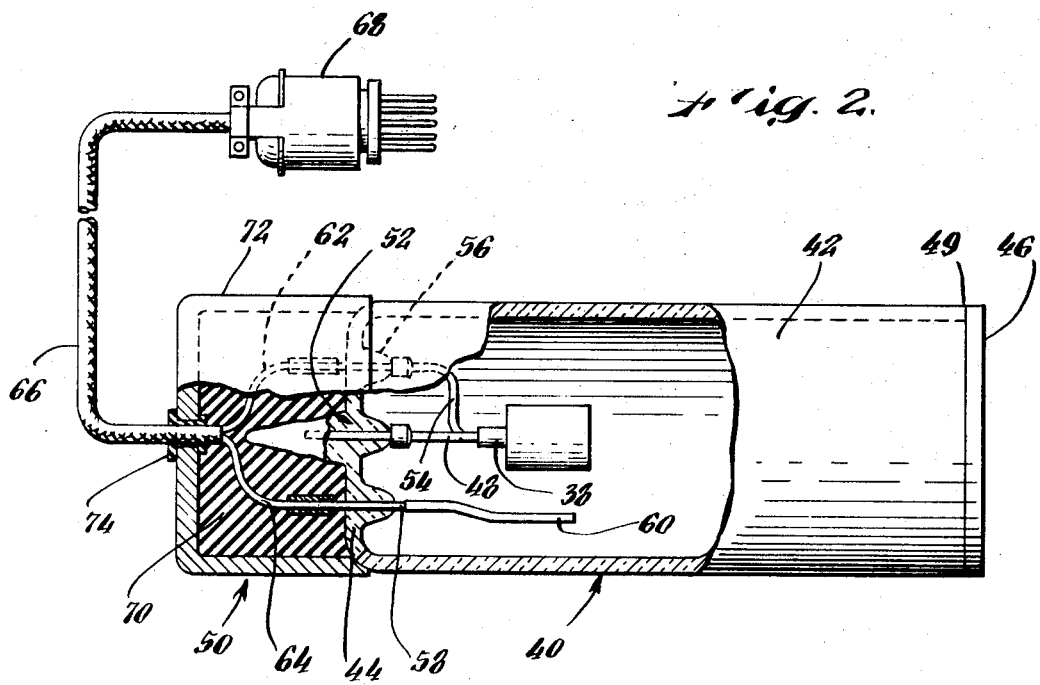
INVENTOR.
John W Vollmer
BY
ATTORNEY.

United States Patent Office 3,361,925
Patented Jan. 2, 1968

3,361,925
BISMUTH-LITHIUM HOLLOW CATHODE LAMPS
John W. Vollmer, Norwalk, Conn., assignor to The Perkin-Elmer Corporation, Norwalk, Conn., a corporation of New York
Filed Nov. 3, 1966, Ser. No. 591,748
3 Claims. (Cl. 313—310)

ABSTRACT OF THE DISCLOSURE

In a hollow cathode lamp of the type useful as a spectral radiation source for atomic absorption spectrometers, the interior of the hollow cathode is coated with a bismuth-lithium alloy. This alloy contains only a small percentage (i.e., about 4%) of lithium and the rest bismuth, so as to reduce the vapor pressure of the bismuth during operation. Besides thereby increasing the useful life of the lamp (or allowing greater intensity over a reasonable life) for bismuth analysis, the inventive lamp may be used as a lithium radiation source as well.

---

This invention relates to an improved hollow cathode used in a lamp, of the type especially useful as a light source in spectroscopic instruments of the atomic absorption type. More particularly this invention concerns an improved hollow cathode lamp, which is useful primarily for atomic absorption measurements of bismuth, and secondarily for lithium.

In atomic absorption spectroscopy the sample is analyzed by determining the absorption (at a certain specific wavelength of radiation) caused by the atoms for which the analytical test is being made. This technique is particularly useful for analyzing (both qualitatively and quantitatively) a sample containing one or more metals or metallic compounds. Usually the metallic sample is converted into a salt (if necessary), then is dissolved in a liquid solvent (such as water), and is then vaporized in the flame of a burner, so that the sample is atomized. The atomized sample is then irradiated with a light source, which is of great intensity at least at one characteristic absorption band of the metal for which the test is being made. Only radiation in the region of this characteristic wavelength which is passed through the sample is then allowed to affect a detector, which therefore yields a measurement of how much absorption has occurred. The detected intensity (as compared to the original source intensity, for example) therefore yields a quantitative measurement of the absorption and therefore the concentration of the paricular metal for which the analysis is being conducted.

In order to irradiate the sample at high intensity in the narrow absorption band, the light source itself preferably includes a relatively high concentration of the metal for which the test is being made. At the present time the typical such light source is the hollow cathode lamp, in which a cup-shaped element (including at least a substantial percentage of the metal for which the test is intended) acts as the negative electrode of the lamp. Both this hollow cathode and the positive electrode are hermetically sealed within a glass envelope in a low pressure atmosphere of an inert (noble) gas.

Ideally a hollow cathode should produce the desired spectral band at high intensity, without substantial intensity fluctuations with time, and have a long useful life. Thus, the cathode material must be able to withstand the relatively high temperatures necessarily developed when electrical currents are passed therethrough (as is necessary to develop the high intensity radiation). In particular the cathode material should not boil, sublime, unduly sputter, decompose or change its relative composition (i.e., the various constituents should maintain substantially the same proportions before and after a reasonable period of use). Ideally the cathode material should also be capable of being formed into the desired cup shape relatively readily.

For those metals intrinsically having the desired properties (such as: a melting point above, say, about 500° C.; moderate vapor pressure in the neighborhood of this temperature; good machinability and other mechanical characteristics, and the like), the hollow cathode may be composed of the pure metal desired (such as copper, silver, and many other metals having the above-mentioned properties). When the material desired to be incorporated in the hollow cathode lacks one or more of the desired properties, other techniques must be utilized to obtain a satisfactory cathode including these materials.

One possible technique is the utilization of the desired metal in the form of a mixture or alloy (both terms being used in their broadest sense) with one or more other metals or other materials. Alternatively the pure metal may be used as a coating (of various thicknesses) on the interior of a hollow cathode cup or holder. It is of course possible to combine both of these techniques, namely, by forming a mixture or alloy and then using the resulting substance as the interior coating of the hollow cathode holder. The present invention utilizes such a combined technique, so as to provide an improved hollow cathode assembly, particularly useful in a lamp for bismuth (and secondarily lithium) atomic absorption analysis.

An object of the invention is accordingly the provision of an improved hollow cathode assembly for use in a lamp emitting radiation in the characteristic spectrum of bismuth.

A related object is the provision of such a hollow cathode, which allows an otherwise conventional lamp to provide greater energy at the bismuth spectral wavelength than has been previously possible with existing lamps.

Another object is the provision of such a lamp that may be utilized not only for bismuth atomic absorption analysis, but also for such analysis of lithium.

Other objects and advantages of the invention will become obvious to one skilled in the art upon reading the following detailed description of an exemplary embodiment of the invention in conjunction with the accompanying drawing, in which:

FIG. 1 is a vertical cross section through the improved hollow cathode assembly, incorporating the bismuth-lithium alloy of the invention; and FIG. 2 is a part elevation, part vertical section through an otherwise known type of lamp, incorporating the hollow cathode assembly of the invention.

FIG. 1 shows a finished hollow cathode assembly 30, in which an iron cathode holder 32 has on its interior cup-shaped surface a thick coating 34 of a bismuth-lithium alloy according to the invention. The interior surface 36 of the bismuth-lithium alloy coating is shown as conforming generally to a paraboloid, since this is the shape in which it is generally formed during manufacture. The cathode holder or cup 32 itself is of generally conventional construction, and includes a conventional supporting portion 38 for crimping to a supporting pin in the finished lamp, as will be described hereinafter.

The preferred process for forming the hollow cathode assembly of FIG. 1 is as follows. One gram of clean bismuth (commercially available in the form of small shot) and 0.04 of a gram of pure lithium (commercially available, for example, in the form of ⅛ inch diameter wire) are placed within an upright iron hollow cathode holder 32 (i.e., with its supporting end, 38, lowermost), within a dust-free, nonoxidizing atmosphere. The use of argon as the inert atmosphere has been used satisfactorily. Care must be maintained to keep not only the parts and materials, but also the atmosphere and implements used as clean and dust free as possible. Because of its high chemical activity, lithium is always kept under an inert liquid (for example, oil) prior to use; even the weighing of the lithium must be accomplished while it is still covered with oil so as to exclude atmospheric oxygen. The lithium is finally washed free of this coating (for example, in at least two rinses of benzene) and then should be maintained in an oxidant-free atmosphere thereafter, as previously noted. The lithium and bismuth within the iron cathode holder are then melted in this inert atmosphere, for example, by use of an induction heater. Upon complete melting the lithium and bismuth will alloy; since this alloying is exothermic, overheating must be carefully avoided.

The upright hollow cathode holder with the melted alloy therein is then spun (as in a covered centrifuge, in which all of the operations may conveniently be done) until the bismuth-lithium alloy climbs approximately three-quarters of the way up the interior surface of the iron holder, so as to form the parabolic shaped coating indicated in FIG. 1. The spinning operation is continued as the bismuth-lithium compound cools and hardens, the inert (argon) atmospheric conditions being maintained throughout all these operations. This maintenance of an inert atmosphere may be conveniently accomplished by using a continuous argon flow. Even after the entire assembly has cooled substantially to room temperature, the cathode assembly should be maintained in an inert atmosphere; temporary storage may be conveniently accomplished by placing the finished assembly in a jar filled with argon. The hollow cathode assembly may be then installed in an essentially conventional lamp in a now-known manner.

FIG. 2 shows the completed lamp, with the supporting portion 38 of the hollow cathode assembly crimped to a metallic pin 48 of the lamp. As just stated, the steps of assembly of such a lamp are now known, but are hereinafter given for purposes of completeness. It will be assumed that all parts of the lamp have been already assembled, except that window 46 is still unattached (so that the right-hand end of tube 42 is open) and of course hollow cathode assembly 30 has not yet been introduced into the lamp and crimped on the main supporting pin 48. The assembled stem 44 and tube 42 assembly 40 and the window 46 to be used for the final lamp are baked in a vacuum oven (after allowing warm up). After partial cooling, the oven is back-filled with highly purified nitrogen. When the assembly is essentially at room temperature, the hollow cathode assembly 30 is passed into the open (right-hand) end of the tube 42, so that the support portion 38 of the hollow cathode is positioned on center pin 48 of the stem assembly 44. The support portion 38 of the hollow cathode 30 is then crimped to the center pin 48, thus anchoring it to the stem and tube assembly 44, 42. The window 46 is then cemented on the assembled tube with epoxy at 49, which is then cured (for example, for two hours at between 160° F. and 180° F.).

During this epoxy curing, the lamp is flushed with highly purified nitrogen (at about five cubic feet per hour) continuously by means of a glass connection tube (not shown) through the stem 44. After cooling this connection tube is plugged with a stopper, and a leak check is performed with helium gas. No detectable leak (even with helium) should occur. The almost completed lamp is refilled with argon and replugged with a stopper. The lamp is then evacuated to a measured vacuum having a pressure no higher than $1 \times 10^{-6}$ millimeters of mercury, and baked after allowing a warm-up period. After this degassing step the lamp is ready to be run in and finally sealed.

The run-in consists of operating the lamp with a low neon pressure inside the lamp, with evacuation steps (the vacuum being at least as good as $10^{-6}$ mm.) between each run. After each run the lamp is allowed to cool, is then evacuated, and is then refilled with fresh neon gas; and the next run of the run-in schedule performed. Following the last of such run-in periods the connection tube of the stem part of the lamp is cut off (i.e., the lamp is sealed), and the sealed lamp then run for an additional period. The voltage drop across the lamp should preferably be measured near the end of each of these runs so as to yield data for the individual lamp, which will be useful to the user and also forms a basis for quality control.

As may be seen in FIG. 2, the final lamp normally has an essentially conventional base 50 of insulating material cemented (as at 52) to the stem assembly 44 (which has already been joined to the left-hand end of the tube 42). In the particular lamp shown, the center pin 48 is electrically connected at 54 to a different one 56 of the various pins (of which only three are shown at 48, 56, 58) of the stem assembly. Lower pin 58 carries the slightly bent rod-like anode 60. The left-hand ends of pins 56 and 58 are connected to electrical leads 62, 64, respectively which may be brought out of base 50 as a single insulated cable 66, terminating in electrical plug connector 68. Base 50 may consist of an insulating filler 70 (in which leads 62 and 64 are embedded in a slack manner), an outer hard casing 72, and a strain relief 74 (for holding the cable 66 in place). The lamp as shown in FIG. 2 is ready for use, e.g., as a light source for atomic absorption spectroscopy.

The improved hollow cathode lamp incorporating the inventive bismuth-lithium alloy coated hollow cathode lamp assembly has been successfully run at 30 milliamperes. The addition of only this small (4% by weight) amount of lithium not only elevates the melting temperature (of the alloy) relative to the melting point of bismuth, but additionally substantially reduces the vapor pressure, so as to allow such relatively high current operation. Under such operating conditions, the surface 36 of the bismuth-lithium alloy becomes somewhat slushy, but not sufficiently liquid to actually flow. The lamp may be operated at even higher currents, thereby causing essentially complete melting of the alloy. Especially when such liquid operating conditions are anticipated, it is preferable to cause the open end 82 of the cathode cup 32 to be turned in, as by swaging. This swaging would normally be done as one of the first steps of the manufacturing process (i.e., before the bismuth and lithium were placed within the cathode holder).

Although an alloy containing approximately 4% lithium and 96% bismuth (i.e., approximately one gram of bismuth and 40 milligrams of lithium) is preferred, the percentage of lithium may vary at least within a moderate range with satisfactory results. In particular bismuth-lithium alloys containing from 3.0 to 6.3 percent have proved satisfactory in actual use. Lamp life expectancy (with 4% lithium alloys run at 30 ma.) is in the hundreds of hours. Not only is the improved lamp a practical source of relatively high-energy bismuth radiation, but it is quite satisfactory as a source of lithium radiation as well. When utilized as a source of lithium spectral radiation, the adjustable slits of the monochromator should be used at quite narrow width to avoid undesirable interaction between the closely adjacent lithium and neon spectral lines.

Hollow cathode lamps utilizing the disclosed (approximately 4%) lithium-bismuth alloy thus not only may be operated at relatively high energy levels (i.e., about 30 ma.) but also may be even run at higher energy levels in which the alloy completely melts (although with some loss of the length of life). Further, the same lamp may be used to provide the spectral emission from lithium, in addition to its more normal use as a bismuth spectral emitter. Thus the lamp of the invention provides a three-fold utility: (1) a long-lived relatively high energy source of bismuth radiation; (2) a moderately long-lived extremely high intensity source of such radiation; and (3) a practical, long-lived source of moderately high lithium spectral radiation. Although a specific embodiment and manufacturing method of the invention have been described in order to satisfy the patent statute, the invention is not limited to any of the details of the preferred mode of manufacture. Rather, the invention is defined by the scope of the appended claims.

I claim:

1. In a hollow cathode lamp of the type in which the hollow cathode assembly thereof comprises a substantially cup-shaped hollow cathode holder and an interior coating thereon, said coating comprising a particular metal for which spectral emission radiation is desired, the improvement in which:

said metal interior coating comprises an alloy containing a small quantity of lithium of between about 2% and 7% by weight and the rest substantially bismuth, said coating therefore containing between about 93% and 98% bismuth by weight, whereby a relatively long-lived, bright source of bismuth spectral radiation may be obtained at relatively high electrical energy, and a useful source of lithium spectral radiation is also concurrently available.

2. An improved hollow cathode lamp according to claim 1, in which:

said alloy constitutes about 4% by weight lithium and substantially all the rest, and therefore about 96% by weight, bismuth.

3. An improved hollow cathode lamp according to claim 1, in which:

said cup-shaped hollow cathode holder comprises substantially pure iron.

References Cited

UNITED STATES PATENTS

| 2,840,751 | 6/1958 | Meister | 313—346 X |
| 2,913,298 | 11/1959 | Lemaigre-Voreaux | 313—218 X |

FOREIGN PATENTS 202,582  7/1956  Australia.

OTHER REFERENCES

F. G. Spreadbury: Electric Discharge Lighting, Copyright 1946, p. 69 relied on.

JAMES W. LAWRENCE, *Primary Examiner.*

S. D. SCHLOSSER, *Examiner.*